United States Patent Office 3,476,587
Patented Nov. 4, 1969

3,476,587
PLURAL COATED WATERPROOF SUPPORT
Pierre Demol, Brussels, and Pierre Mathis, Schaerbeek, Belgium, assignors to Solvay & Cie, Brussels, Belgium
No Drawing. Filed May 6, 1966, Ser. No. 548,066
Claims priority, application Belgium, May 19, 1965, 664,139
Int. Cl. B44d 1/14, 5/00
U.S. Cl. 117—76          10 Claims

ABSTRACT OF THE DISCLOSURE

Resistance to folding and rubbing, as well as water impermeability, are imparted to a substrate by coating same with two vinylidene chloride copolymers, one of said copolymers being hard and brittle and the other being supple.

---

The present invention relates to various types of supports which are rendered waterproof with the aid of a polymeric coating and more particularly to a novel process of waterproofing and to such supports rendered waterproof by the employment of a coating of two or more copolymers of vinylidene chloride.

It is well known that copolymers having a base of vinylidene chloride have been used for coating various supports, i.e., paper, cardboard, leather, etc., in order to render them waterproof. These copolymers are generally prepared by polymerization in an aqueous emulsion. Although the coating operation can be performed starting with organic solutions of the copolymers, for economic reasons, it has been preferred to start with aqueous emulsions. In such a process, it is not absolutely necessary to separate the copolymer from the polymerization medium and thus the problem of the recovery of a solvent need not arise.

Numerous copolymers of vinylidene chloride have already been proposed and used for the coating of various supports from aqueous emulsions. However, none of the known copolymers, considered individually, has been capable to confer to the support an impermeability to water vapor, gas and greases which is at the same time sufficiently high and durable.

In accordance with the present invention, however, it has now been found that a coating for supports which confers to such supports a high impermeability to water, water vapor, gases, greases, oils, etc., such high impermeability being retained after manipulation, can be produced by employing at least 2 copolymers of vinylidene chloride, which copolymers have different compositions and natures.

It is therefore a principal object of the present invention to provide waterproofed supports, and a process for producing such supports which are free from the inherent deficiencies of previously employed materials.

Still a further object of the present invention comprises a coating for supports which confers to such supports, a high impermeability to water, water vapor, gases, greases, oils, etc. . . . such high impermeability having great durability.

It is yet a further object of the present invention to coat supports in which the waterproof coating comprises at least two copolymers of vinylidene chloride, such copolymers differing in composition and nature.

A still further object of the present invention is to provide such coated supports wherein the coating comprises a combination of "supple" and "hard" copolymers of vinylidene chloride.

Still further objects and advantages of the present invention will become more apparent from the following more detailed description of the invention.

By selecting several copolymers of vinylidene chloride which have different compositions and natures, and by combining them, it has now been found that it is possible to prepare coated supports possessing an increased initial impermeability to liquids, gases, etc., which is retained to an extremely acceptable degree after manipulation.

In general, any support capable of being rendered impermeable to liquids, gases, etc., by coating with a synthetic plastic can be advantageously treated in accordance with the present invention. Suitable, non-limitative, examples include paper, cardboard, pasteboard, plywood and other wood products, leather (both natural and artificial), fabrics (knitted, woven, etc.), rubber, cellophane and various thermosetting and thermoplastic resinous materials.

The present invention is thus directed to such suitable supports which are rendered waterproof, etc., with the aid of a coating which has as a base two or more copolymers of vinylidene chloride, such coating being preferably applied from aqueous emulsions. The coated supports are further characterized in that at least one copolymer of vinylidene chloride is chosen from among the "supple" copolymers and at least one other is chosen from among those copolymers characterized as "hard."

The copolymers of vinylidene chloride which are exemplified as "hard" are characterized by a very high concentration of vinylidene chloride. The weight ratio between vinylidene chloride and the other comonomer or comonomers is between 4 and 49. The suitable comonomers are chosen from among acrylonitrile, methacrylonitrile and the esters derived from unsaturated mono- or polycarboxylic acids and saturated alcohols containing a maximum of 4 carbon atoms. Among the above-mentioned esters, acrylates, methacrylates, itaconates and alkyl fumarates of the $C_1$–$C_4$ type are preferred.

These copolymers identified as "hard," when employed alone, give the support an initially high impermeability, but the coating is hard and brittle and does not resist the folding or rubbing of the coated support. If employed alone, therefore, a substantial decrease in the impermeability results.

Among the copolymers which are characterized as "supple," it is preferred to use the internally plasticized copolymers of vinylidene chloride and vinyl chloride in which the vinylidene chloride/vinyl chloride weight ratio is between 0.6 and 4 and the plasticizing comonomer or comonomers, which are present in a concentration of 1–100 grams per kilogram, preferably 5–50 grams per kilogram, are chosen from among the esters of unsaturated mono- or polycarboxylic acids and saturated alcohols containing 4 to 18 carbon atoms, the vinyl esters of saturated carboxylic acids containing 6 to 18 carbon atoms, and mixtures of these. Among the esters of the first type, acrylates, methacrylates, itaconates and alkyl fumarates of the $C_4$–$C_{18}$, for example ethylhexyl, are preferred. Vinyl stearate and vinyl laurate are exemplary of the vinyl carboxylates useful herein.

Supports coated only by means of copolymers identified as "supple" present a poor initial impermeability in comparison with supports coated by means of one of the "hard" copolymers. However, they are much more resistant to manipulation.

By utilizing at the same time "hard" copolymers and "supple" copolymers for coating the same support, it has now been found that it is possible to avoid to a large extent the defects of the two types of copolymers while at the same time conserving their distinct advantages.

The "hard" and "supple" copolymers utilized in the present invention can also contain components derived from other monomers for the purpose of improving certain properties of the coatings. Thus, for the purpose of giving the coating a suitable adherence to the support, polymerization of a small amount of a holding (clinging)

The composition of the various copolymers utilized is summarized in Table I below.

TABLE 1

| Composition of copolymers | Test No. | | | | | | | | | | | | | | | | | | | |
|---|---|---|---|---|---|---|---|---|---|---|---|---|---|---|---|---|---|---|---|---|
| | 1 | | 2 | | 3 | | 4 | | 5 | | 6 | | 7 | | 8 | | 9 | | 10 | |
| | No. of Layers | | | | | | | | | | | | | | | | | | | |
| | 1 | 2 | 1 | 2 | 1 | 2 | 1 | 2 | 1 | 2 | 1 | 2 | 1 | 2 | 1 | 2 | 1 | 2 | 1 | 2 |
| Vinylidene chloride, gr./Kgr | 920 | 920 | 590 | 590 | 590 | 920 | 590 | 920 | 720 | 720 | 720 | 920 | 570 | 570 | 570 | 920 | 605 | 920 | 590 | 920 |
| Methyl acrylate, gr./Kgr | 80 | 80 | | | | 80 | | 80 | | | | 80 | | | | 80 | | 80 | | 80 |
| Vinyl chloride, gr./Kgr | | | 380 | 380 | 380 | | 380 | | 220 | 220 | 220 | | 380 | 380 | 380 | | 380 | | 380 | |
| Ethylhexyl acrylate, gr./Kgr | | | 30 | 30 | 30 | | ¹30 | | | | | | | | | | | | | |
| Ethylhexyl fumarate, gr./Kgr | | | | | | | | | 60 | 60 | 60 | | | | | | | | | |
| Vinyl stearate, gr./Kgr | | | | | | | | | | | | | 50 | 50 | 50 | | | | | |
| Ethylhexyl itaconate, gr./Kgr | | | | | | | | | | | | | | | | | 15 | | | |
| Lauryl methacrylate, gr./Kgr | | | | | | | | | | | | | | | | | | | 30 | |

¹ At the time of the preparation of the copolymer the ethylhexyl acrylate was introduced in a delayed manner between the 7th and the 10th hour of the polymerization.

monomer such as acrylic acid, maleic anhydride, acrylamide, or itaconic acid could be advantageously employed.

Moreover, more stable emulsions of the various copolymers can be obtained by effecting the polymerization in the presence of a small quantity of a polymerizable compound such as vinylsulfonic acid.

The various copolymers of the present invention can be prepared by any known polymerization process capable of producing aqueous emulsions.

The coating of the support can be carried out in several ways in accordance with the present invention. In order to simplify the operation, the aqueous emulsions of the chosen "hard" and "supple" copolymer or copolymers may be mixed and coated on the support in one or several layers.

However, the best results with respect to impermeability may be obtained by sequentially applying to the support at least one sub-layer of an aqueous emulsion of one or more "supple" copolymers, with subsequent application of at least one layer having a base of one or more "hard" copolymers.

The following examples illustrate various embodiments of the present invention. It is to be understood that these examples are presented for purposes of illustration only and the invention is in no way to be deemed as limited thereto.

Examples

Various tests were carried out by applying two coating layers to kraft paper and the impermeability properties of the coated support determined.

Table I gives the compositions of the copolymers utilized for the different layers of the coatings used in the tests.

The tests 1, 2, 5 and 7 are supplied for comparative purposes. In test 1, the two layers of the coating are constituted by the same copolymer of the "hard" type while in tests 2, 5 and 7 there is employed an aqueous emulsion of only one "supple" copolymer.

In tests 3, 4, 6, 8, 9 and 10, the sublayer is produced from an aqueous emulsion of a "supple" copolymer and the upper layer consists of a "hard" copolymer.

In all of the above-noted tests, the coating was effectuated by means of a machine equipped with an "air sheet" device for regulating the weight of the coating at a level of 20 grams per sq. meter for the first layer and 10 grams per sq. meter for the second layer.

After each passage, the coating was dried in a horizontal tunnel which was swept by an air current at 135° C., and equipped with infra-red radiation emitting elements at its beginning and end.

One portion of the coated paper was subjected for forty-eight hours to a conditioning at 43% relative humidity and 23° C., in such a manner as to give it a water content of 7 to 8%.

The other portion was placed for 48 hours in a drying-oven at 50° C. This treatment is used to illustrate accelerated ageing which results in complete evolution in the crystallinity rate (proportion) of the coating. After this treatment, the aged, coated paper was subjected to the conditioning treatment set forth.

On one portion of the aged and non-aged papers, a severe rubbing abrading was effectuated by carrying out a simultaneous translational and rotational movement, on a GELBO-TESTER apparatus.

On the four types of samples produced, i.e., non-aged, non-abraded paper; abraded, non-aged paper; non-abraded aged paper; and abraded, aged paper, tests were carried out to determine the porosity to greases and the permeability to water vapor.

The porosity test carried out with respect to greases consisted of applying a layer of red colored essence of turpentine on the coated surface of the paper, and then covering it with a glass plate for preventing the evaporation of the turpentine. After 15 minutes, the number of pits which appeared on the noncoated face of the paper were counted and the results expressed in the number of pits found per sq. meter.

The permeability to water vapor was measured by the method described in ASTM E96–53T standard, procedure E, tropical conditions (90% relative humidity and 37.8° C.). In the case of non-abraded paper, the samples were stretched over pans containing dehydrating agents, while the samples of abraded paper were used for the production, by thermo-sealing, of sachets containing the dehydrating agent.

The results obtained are shown in Table II.

TABLE II

| Properties of coated paper | Test No. | | | | | | | | | |
|---|---|---|---|---|---|---|---|---|---|---|
| | 1 | 2 | 3 | 4 | 5 | 6 | 7 | 8 | 9 | 10 |
| Porosity to greases, pits/m.²: | | | | | | | | | | |
| Non-abraded, non-aged | 0 | 20 | 0 | 0 | 120 | 80 | 80 | 50 | 30 | 100 |
| Non-abraded, aged | 50 | 100 | 30 | 20 | 150 | 130 | 100 | 80 | 50 | 150 |
| Abraded, non-aged | 9,700 | 5,000 | 1,500 | 1,500 | 6,000 | 3,500 | 5,500 | 2,400 | 2,000 | 2,600 |
| Abraded, aged | >15,000 | 5,600 | 5,000 | 4,500 | 6,900 | 7,000 | 6,800 | 6,700 | 7,000 | 7,000 |
| Permeability to water vapor, gr./m.²: | | | | | | | | | | |
| Non-abraded, non-aged | 9.1 | 16 | 5 | 3.4 | 17.4 | 12.6 | 16.1 | 7.6 | 4.8 | 8.9 |
| Non-abraded, aged | 10.5 | 16.2 | 5.2 | 3.1 | 18.9 | 13.1 | 16.3 | 8.7 | 5.4 | 9.3 |
| Abraded, non-aged | 27.8 | 23.7 | 8.9 | 6.9 | 26.7 | 20.8 | 25.6 | 11.9 | 10.1 | 13.5 |
| Abraded, aged | 75.7 | 41.7 | 25.4 | 23.1 | 58.7 | 48.2 | 42 | 34.5 | 30.5 | 38.7 |

A comparison between the properties of coated papers considered in tests 1, 2, 5 and 7, provided for reference purposes, and the properties of the coated papers considered in the other tests permits a ready appreciation of the progress represented by the supports which were rendered impermeable according to the present invention. Thus, with respect to impermeability to greases, a greater number of pits were observed in the coating not in accordance with the present invention than were observed when the combined "supple" and "hard" coating of the present invention was employed. Similarly, with respect to impermeability of water vapor, the unusually advantageous properties of the combined coating of the present invention are easily observed.

It will be understood that the above description of the present invention is susceptible to various modifications, changes, and adaptations, and the same are intended to be comprehended within the meaning and range of equivalents.

What is claimed is:

1. A waterproof coated support comprising a substrate coated with at least one sublayer and at least one outer layer, each sublayer comprising a "supple" vinylidene chloride/vinyl chloride copolymer having a weight ratio of vinylidene chloride to vinyl chloride between 0.6 and 4 and containing from 1 to 100 grams per kilogram derived from monomer having a plasticizing character and selected from the group consisting of (1) an ester derived from (a) an unsaturated mono- or polycarboxylic acid and (b) a saturated alcohol containing from 4 to 18 carbon atoms, (2) a vinyl ester of a saturated carboxylic acid containing from 6 to 18 carbon atoms and (3) a mixture of esters selected from the group consisting of those defined in (1) and (2) and each outer layer comprising a "hard" vinylidene chloride copolymer in which the weight ratio of vinylidene chloride to copolymerizable monomer is between 4 and 49, the copolymerizable monomer comprising at least one member selected from the group consisting of (1) acrylonitrile, (2) methacrylonitrile and (3) an ester derived from (a) an unsaturated mono- or polycarboxylic acid and (b) a saturated alcohol containing at most 4 carbon atoms.

2. A coated support according to claim 1 wherein the substrate is paper, cardboard, pasteboard or plywood.

3. A coated support according to claim 1 wherein the substrate is kraft paper.

4. A coated support according to claim 1, the monomer having a plasticising character being selected from the group consisting of (1) an acrylate, methacrylate, fumarate or itaconate of a saturated alcohol having from 4 to 18 carbon atoms, (2) vinyl stearate and (3) vinyl laurate and the copolymerizable monomer in the hard vinylidene chloride copolymer being selected from the group consisting of (1) acrylonitrile, (2) methacrylonitrile and (3) an acrylate, methacrylate, fumarate or itaconate of a saturated alcohol containing a maximum of four carbon atoms.

5. A coated support according to claim 1 wherein the "hard" vinylidene chloride copolymer is a vinylidene chloride/methyl acrylate copolymer.

6. A coated support according to claim 1 wherein the "supple" copolymer is a vinylidene chloride/vinyl chloride/ethylhexyl acrylate terpolymer.

7. A coated support according to claim 1 wherein the "supple" copolymer is a vinylidene chloride/vinyl chloride/ethylhexyl fumarate terpolymer.

8. A coated support according to claim 1 wherein the "supple" copolymer is a vinylidene chloride/vanyl chloride/vinyl stearate terpolymer.

9. A coated support according to claim 1 wherein the "supple" copolymer is a vinylidene chloride/vinyl chloride/ethylhexyl itaconate terpolymer.

10. A coated support according to claim 1 wherein the "supple" copolymer is a vinylidene chloride/vinyl chloride/lauryl methacrylate terpolymer.

References Cited
UNITED STATES PATENTS

| | | | |
|---|---|---|---|
| 2,636,870 | 4/1953 | Connors et al. | 117—161 |
| 2,829,069 | 4/1958 | Michel | 117—161 X |
| 3,130,176 | 4/1964 | Zdanowski et al. | 117—72 X |
| 3,240,742 | 3/1966 | Hahn et al. | 260—29.6 X |
| 3,423,232 | 1/1969 | Reinhard et al. | |

WILLIAM D. MARTIN, Primary Examiner

R. HUSACK, Assistant Examiner